Nov. 8, 1966  A. W. GERRANS  3,283,931
APPARATUS FOR REMOVING DRIED PRODUCTS FROM A SUPPORT STRUCTURE
Filed June 8, 1964  10 Sheets-Sheet 1

INVENTOR.
ALFRED W. GERRANS
BY
Mellin, Moore + Weissenberger
ATTORNEYS

United States Patent Office 3,283,931
Patented Nov. 8, 1966

3,283,931
APPARATUS FOR REMOVING DRIED PRODUCTS FROM A SUPPORT STRUCTURE
Alfred W. Gerrans, San Jose, Calif., assignor to Sunsweet Dryers, San Jose, Calif., a corporation of California
Filed June 8, 1964, Ser. No. 373,368
21 Claims. (Cl. 214—310)

This invention generally relates to methods and apparatus for removing discrete particles from an array of stacked supporting shelves to which they are adhered. The invention more particularly relates to methods and apparatus that are of particular utility in connection with the removal of dried prunes from a conventional drying support comprised of a stack of drying trays.

The normal method employed for removing dried prunes from drying trays involves a separation of the trays to permit scraping of each supporting tray surface. This operation is necessarily time consuming and requires much manual labor. Constrasted therewith, the methods and apparatus of the present invention permit removal of prunes from conventional drying trays without necessitating their separation. The invention possesses the further advantage in that it is well suited to line operations where stacks of dried prunes are continuosly processed to remove the prunes therefrom in a minimum of time, and the stacks become immediately available for use in drying other pieces of fruit.

In brief, the methods described herein comprise the steps of gripping a support structure containing trays of dried product, pivoting the structure on a horizontal pivot axis until the supporting surfaces of the structure are disposed in substantially vertical planes, simultaneously scraping the supporting surfaces to cause the dried product to gravitate from the structure, and then pivoting the structure upon the horizontal pivot axis to again place its fruit supporting surfaces in horizontal planes. The final step of pivoting should be carried out to invert the structure, placing the non-supporting surfaces in upward facing relation for receiving the fruit next loaded onto the structure for drying. This method, it has been found, results in less adhesion of the fruit than where the same surface of the supporting trays is used repetitively each drying cycle. Moreover, the useful life of the drying trays is greatly increased by this alternate use of opposite surfaces of each tray.

The above described method is of particular value when the support structures are pivoted on a horizontal axis displaced laterally to one side of the structure. In doing so, the position at which the structures are released in an inverted position will be different than the station at which the structures are picked up. Accordingly, a second structure may be moved into position for pick-up while a structure that has been processed and had dried products removed therefrom is being pivoted into a position for release.

Although the above described methods can be carried out manually, this invention further contemplates and teaches novel forms of apparatus that may be used in practicing those methods. In general, this apparatus comprises means mounted upon a pivoted support frame for gripping and positioning an array of drying trays with surfaces thereof disposed in substantially vertical planes, a scraper assembly including fruit engaging contacts that may be interdigitated with drying trays, and means mounted to the support frame for receiving and conveying fruit from beneath the trays as pieces of fruit are scraped from the tray surfaces. The scraper assembly further includes a guide frame for positioning the fruit engaging contacts relative to the slotted openings between trays.

As indicated above, a primary object of this invention is to provide novel methods and apparatus for expeditiously processing a stacked array of drying trays to remove dried fruit therefrom. In connection with this object, various novel organizations of structure have been devised for accomplishing such a result. Thus, other objects of the invention will become apparent in view of the following detailed description and the accompanying drawings.

In the drawings forming a part of this application and in which like parts are identified by like reference numerals throughout the same.

*General method of operation*

The basic method employed with applicant's invention may be followed with particular reference to FIGS. 1A through 1D. Although the schematic illustration of structure is indicative of the preferred form of apparatus to be described, it will be apparent that the methods employed are not limited to the use of such apparatus.

Figure 1A:
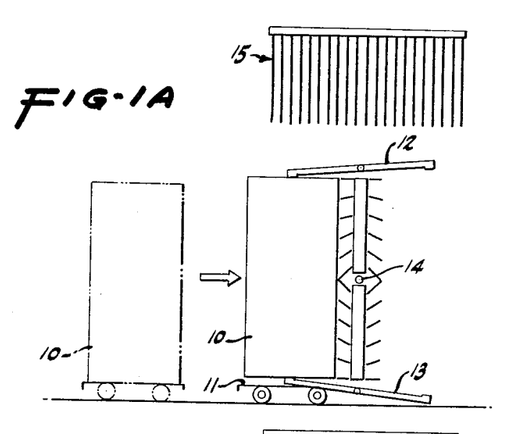
FIGS. 1A, 1B, 1C and 1D are diagrammatic views showing a sequence of steps in processing a conventional stack of drying trays to remove the fruit therefrom in a preferred method contemplated by this teaching.

Referring to FIG. 1A, a conventional stack of drying trays 10 is first moved into a gripping position upon a conventional dolly 11. At this time the stack of trays 10 is gripped top and bottom as by a pair of pivoted clamping arms 12 and 13; and in being gripped trays 10 are lifted from dolly 11. Arms 12 and 13 are next pivoted 90° upon a horizontal pivot axis 14, placing the stack of trays 10 into the position shown in FIG. 1B with their fruit supporting surfaces disposed in vertical planes directly beneath a scraping apparatus, indicated generally by the reference number 15. The scraping apparatus is then moved downwardly interdigitating a plurality of fruit engaging contacts 16 between the supported trays 10. The scraping action of contacts 16 against the surfaces of the trays will dislodge each piece of fruit that is adhered to those surfaces, and the weight of the fruit causes it to gravitate downwardly through a shelf space and a fruit guide 17 until deposited onto one of a pair of conveyor belts 18 or 19, which are used to carry the fruit from beneath trays 10. As prunes are being removed by conveyor belts 18 and 19, a second stack of drying trays 10a are brought into readiness for processing.

Figure 1B:
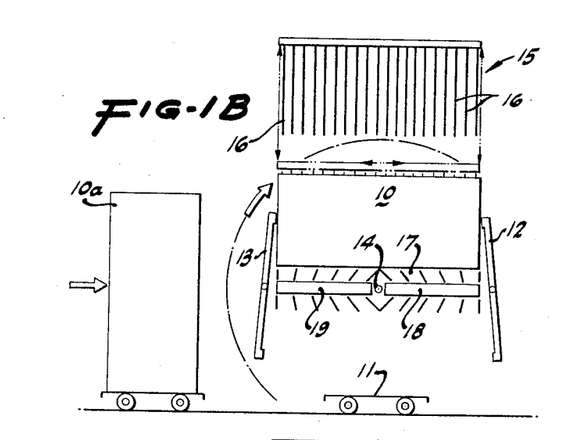
Figure 1C:
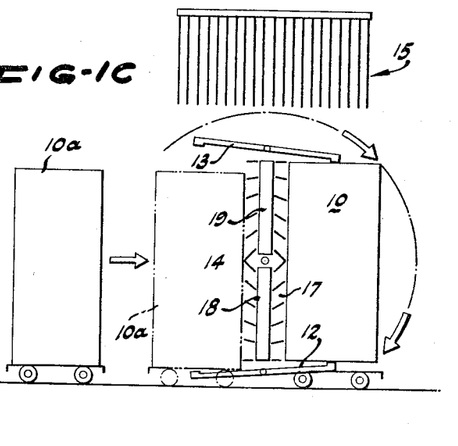
Figure 1D:
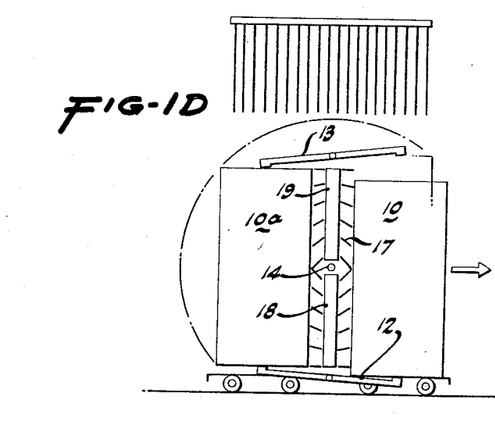

Referring to FIG. 1C, after the dried fruit has been removed from trays 10 the stack is next pivoted upon axis 14 to a release station, at which time the second array of drying trays 10a is advanced into the pick-up station. Clamping arms 12 and 13 are then pivoted upon their respective pivot axes, thereby effecting a simultaneous release of trays 10 while engaging and picking up trays 10a, as illustrated in FIG. 1D. The foregoing description of operation in processing trays 10 is repeated for trays 10a and, of course, each additional stack of loaded drying trays on hand.

It will be apparent that the method described is particularly suited to line operations where one stack of trays is released at the same time that a second stack of trays is gripped for processing. Moreover, each stack of trays that has been processed will also have been inverted, placing the previously unused or non-supporting tray surfaces in upward facing relation. As previously indicated, the alternate use of the tray surfaces is of particular advantage in both prolonging the life of the trays and reducing an adherence of fruit.

Although a preferred form of processing apparatus has been generally indicated, a more particular description of that apparatus will now be given with reference to FIGS. 2—14.

*Description of apparatus*

Figure 2:
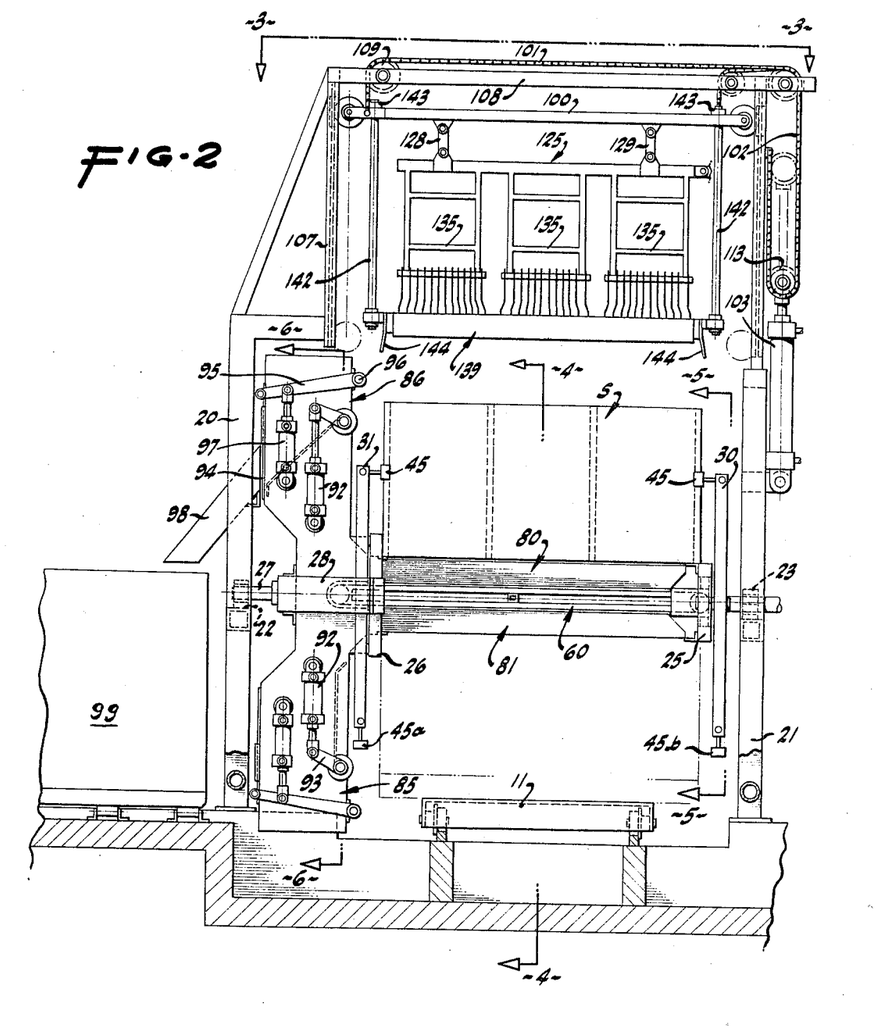
FIG. 2 is an end elevation of one embodiment of apparatus for practicing this invention, said apparatus being shown in a position that may be associated with the illustration of FIG. 1B.
Figure 3:
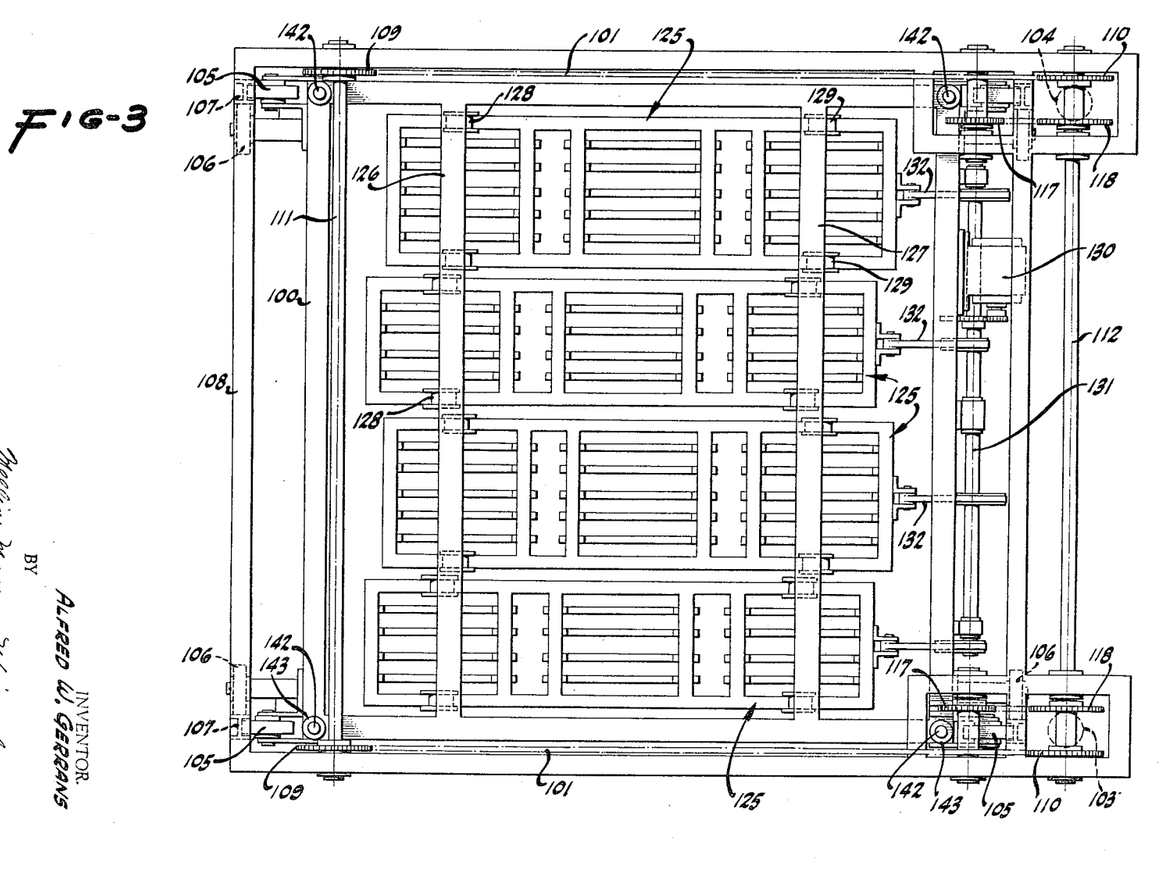
FIG. 3 is a top plan view taken substantially on lines 3—3 of FIG. 2, but showing only the apparatus for scraping dried fruit product from the supported array of drying trays.
Figure 4:
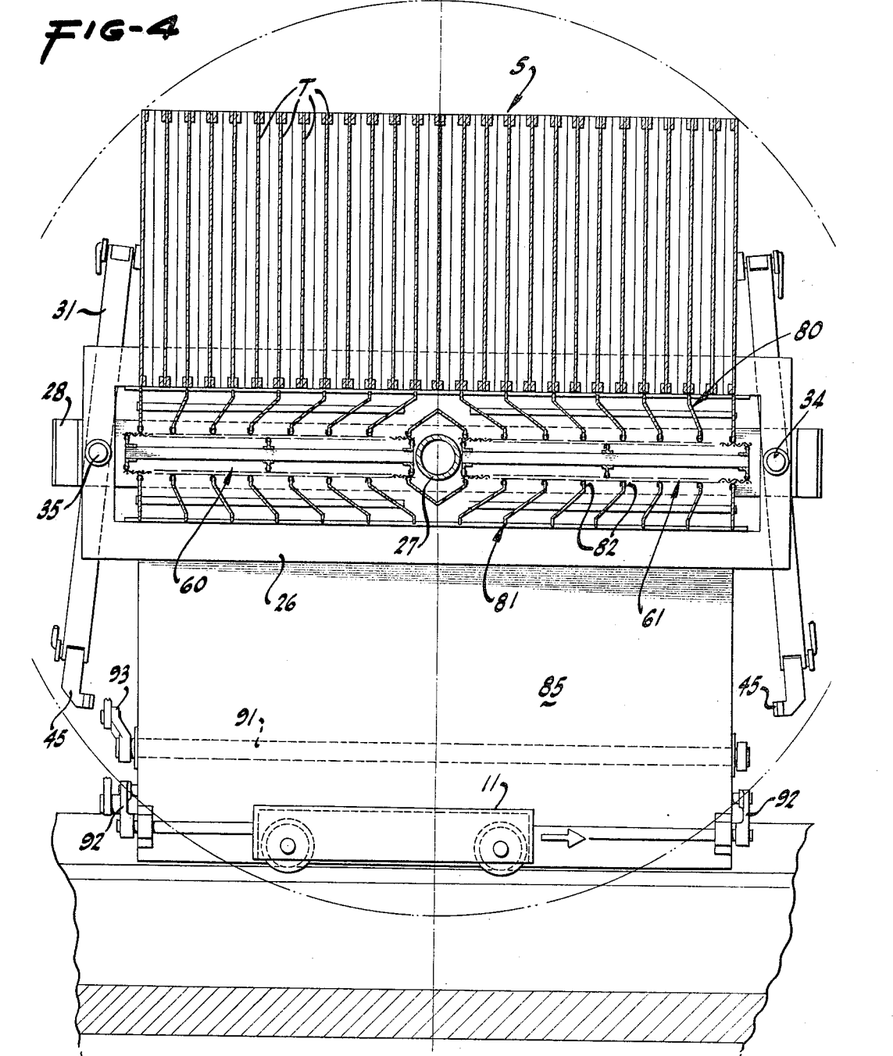
FIG. 4 is a partial section of the apparatus taken on lines 4—4 of FIG. 2.

FIG. 2 of the drawings is an end elevation of a preferred form of apparatus showing an array of drying trays 10 positioned the same as illustrated in FIG. 1B. In general, the apparatus comprises laterally spaced support frames 20 and 21 having split bearing supports 22 and 23, respectively, from which a main support frame is rotatably mounted.

The main support frame essentially comprises a pair of vertically disposed rectangular frames 25 and 26, each secured to a tubular main support shaft 27 on opposite sides of a gripped stack of trays or structure S. Frame 26 is somewhat larger than frame 25 and is secured to shaft 27 by means of a U-shaped frame 28 that lies in a plane common with the axis of support shaft 27. Frame 25 is attached to shaft 27 by a cross plate 29, best shown in FIGS. 5 and 5A.

Figure 5:
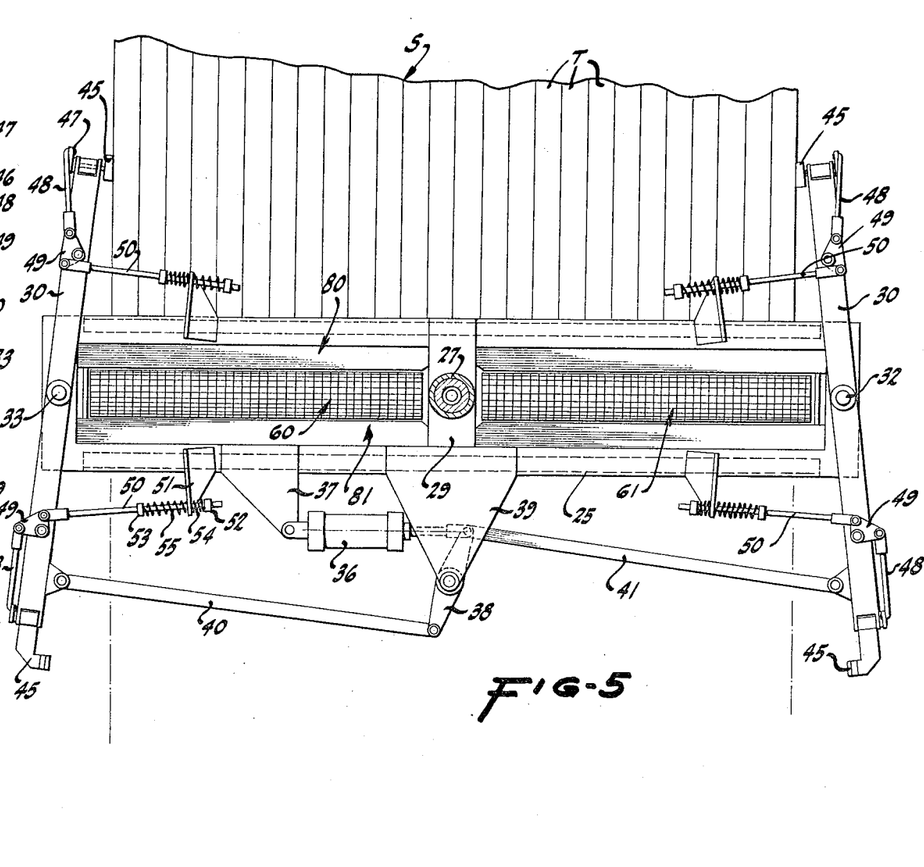
FIG. 5 is a partial section taken on lines 5—5 of FIG. 2.
Figure 5A:
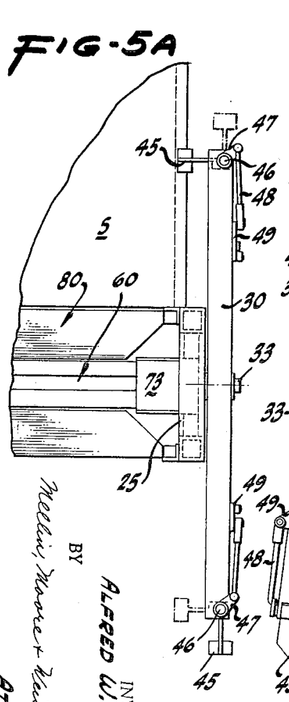
FIG. 5A is an end elevation of apparatus shown in FIG. 5.
Figure 9:
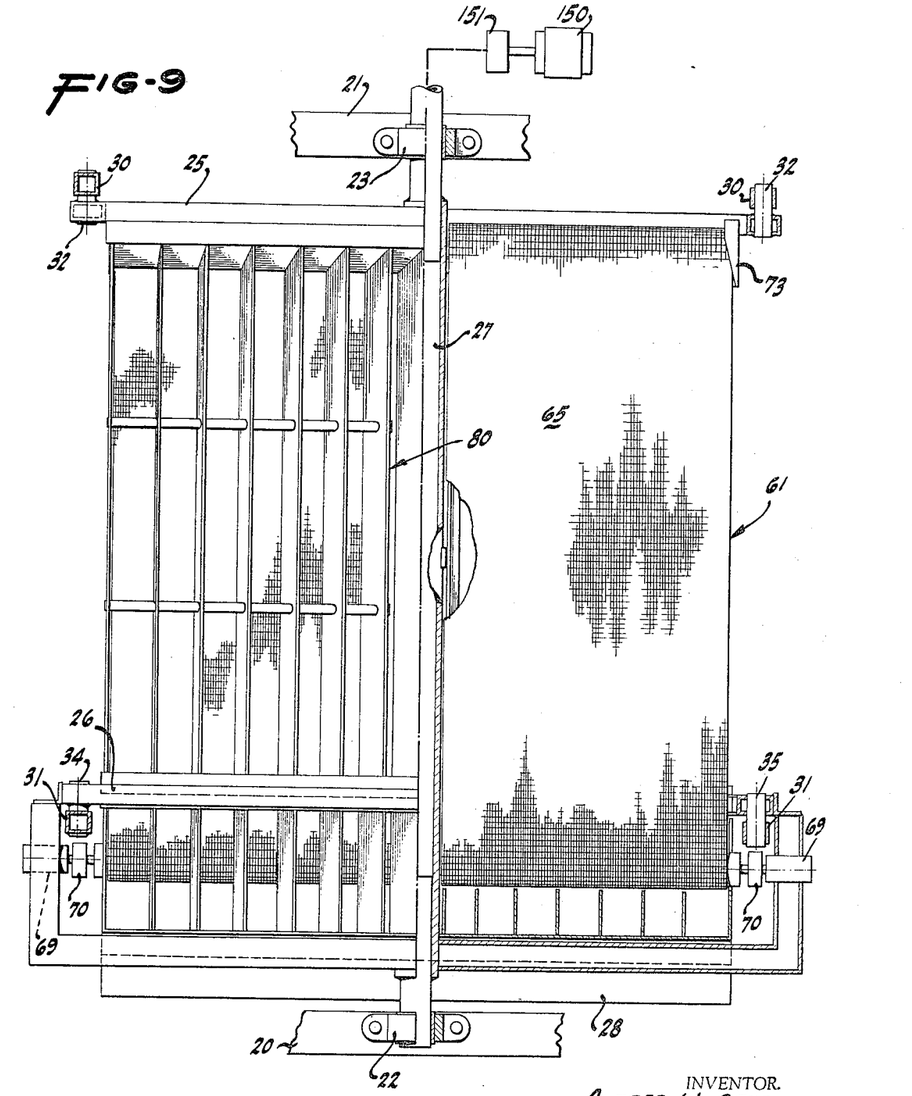
FIG. 9 is a section taken on the broken lines 9—9 of FIG. 6.

Two pairs of identical clamping arms 30 and 31 are pivotally mounted to spaced frames 25 and 26, respectively. With reference to FIG. 5, arms 30 are pivoted upon pins 32 and 33, respectively, and arms 31 are similarly mounted upon pins 34 and 35, as shown in FIG. 9. The four clamping arms are operated together for gripping, lifting and holding a stack of trays during its processing.

Referring to FIG. 5, clamping arms 30 are simultaneously actuated by a hydraulic cylinder 36 pivoted to an ear 37 on frame 25. The piston rod of cylinder 36 is pivotally connected to a crank arm 38 that is pivotally supported on an ear 39, also mounted to frame 25; and crank arm 38 drives a pair of pitmans 40 and 41, which are respectively connected to arms 30. An identical actuating mechanism, including a second cylinder 36 is mounted to frame 26 for operating clamping arms 31. Both hydraulic cylinders 36 would preferably be connected to common pressure lines for simultaneous operation.

Each clamping arm 30 and 31 is provided with a pair of contact arms 45, said contact arms being separately pivoted to engage the edge of a stack when the end of a clamping arm to which it is mounted is pivoted toward a structure that is to be lifted. Conversely, pivoting the end of a clamping arm to release a structure S will pivot contact arms 45 in withdrawn positions. One contact arm 45 is mounted to each end of the clamping arms, and each is secured to and adapted to be pivoted by a pin 46 and a linkage comprising a crank arm 47 secured to pin 46, a connecting rod 48, a triangular crank 49, and a control shaft 50. The end of shaft 50 is received through an opening in a flange plate 51, and a pair of adjustable collars 52 and 53 are adjustably secured along rod 50 with a pair of coiled spring 54 and 55 disposed intermediate the flange of plate 51 and collars 52 and 53, respectively.

It will be evident that each contact arm 45 will be operated as the clamping arm to which it is pivoted is actuated by a cylinder 36. More particularly, and with reference to FIG. 5, contact arms 45 are moved in back of the lateral edges of structure S while the ends of the clamping arms to which they are mounted are moved toward one another. This action is brought about by the unbalanced force of springs 54 and 55, which is created by movement of shaft 50 relative to plate 51. Similarly, springs 54 and 55 will apply an unbalanced force tending to move its associated contact arm out from behind a stack of trays when the end of the clamping arm to which it is pivoted is moved away from the structure.

The importance of the above described clamping arms and actuating mechanism is that a second stack of trays may be moved into position for being picked up although the stack of trays which is being processed has not yet been pivoted into a release position. This fact may be most easily appreciated in view of FIG. 2, where the lower contact arms 45a and 45b of the near clamping arms 31 and 30, respectively, would not obstruct movement of a second structure if such should be advanced into a pick-up position.

Springs 54 and 55 may be selectively balanced by adjustment of collars 52 and 53 as to impose any desired force to operate contact arms 45 after predetermined movement of the clamping arms. Independent adjustment of collars 52 and 53 may also be used to vary the point at which the contact arms 45 begin to pivot from one position to the other. For example, moving collar 53 closer to the flange of plate 51 (as to compress spring 55 a greater amount) would produce an earlier movement of its associated contact arm as the end of the clamping arm to which it is mounted is pivoted toward structure S.

Referring to FIGS. 2, 4, 6, and 9, a pair of continuous belt conveyor assemblies 60 and 61 are supported from main support shaft 27, end frame 25 and U-shaped frame 28. Each conveyor is mounted on diametrically opposite sides of shaft 27 and each consists of an integral assembly that may be separately detached and removed from the support frame, if desired, for purposes of cleaning or repair. Conveyor assemblies 60 and 61 comprise a generally rectangular framework 63 including a central belt supporting rib 64. A continuous wire screen belt 65 extends around framework 63, being supported and driven by four wheels 66 mounted on a pair of shafts 67 and 68 at opposite ends of the conveyor. Shaft 67 and the wheels thereon are driven by a reversible hydraulic motor 69 through a disconnectable shaft 70, said motor being mounted to frame 28. Conveyor frames 63 are supported from main shaft 27 by lateral flanges 71 that are received in U-shaped brackets 72 mounted to shaft 27, and one corner of each conveyor frame 63 is secured to frame 25 by a mounting arm 73 and a bolt fastener 74.

Either conveyor assembly, it will be noted, may be independently removed by disconnecting shaft 70 and removing bolt 74 that secures brackets 73 to frame 25.

Then, by removing the top half of the split bearing 23, either conveyor assembly may be slidably withdrawn through frame 25, said assembly being moved in a direction generally parallel with the axis of shaft 27. In removing either of the conveyors, it is essential that shaft 27 be rotated to a position where the lateral flanges 71 of the conveyor framework are above the lower half of the split bearing, the upper half of the bearing posing no problem or obstruction after its removal.

Figure 10:
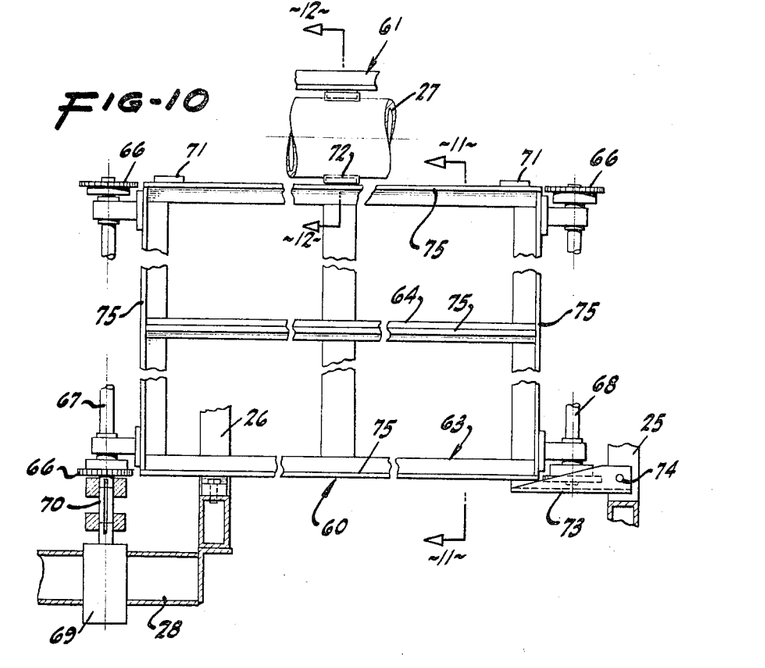
FIG. 10 is a detail and plan view of the framework for one of two identical belt conveyor assemblies, portions of the framework being broken away for convenience of illustration.
Figure 11:
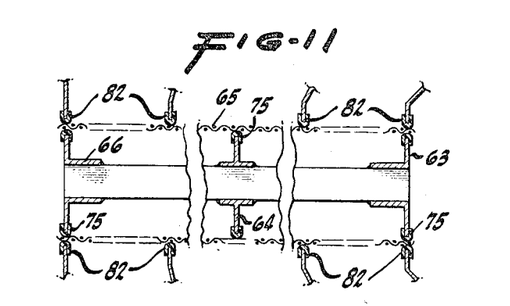
FIG. 11 is a section taken essentially on lines 11—11 of FIG. 10.
Figure 12:
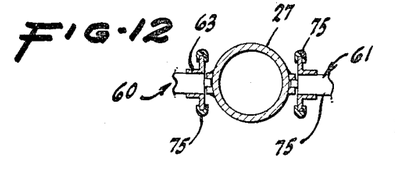
FIG. 12 is a section taken on lines 12—12 of FIG. 10.

The upper and lower flanges of each conveyor framework 63 are provided with wear strips 75, best shown in FIGS. 10–12. Such wear strips greatly enhance the life of the belt 65 while also facilitating its movement when loaded. Inasmuch as both sides of the belt are used in connection with conveying operations (depending on which side of the belt the structure S is gripped) wear strips are provided on both sides of the conveyor frameworks.

Referring to FIGS. 3, 4, 6 and 9, a pair of partitioned fruit guides 80 and 81 are disposed on opposite sides of belt 60 and 61, each fruit guide comprising a series of partition plates that extend longitudinally and parallel with the axis of shaft 27. Both fruit guides are mounted to and connected between rectangular frame 25 and U-shaped frame 28, each partition plate of the fruit guides extending through frame 26 and having one edge in close proximate relationship to a surface of one of the conveyor belts 65 and fitted with a wear strip 82, shown in FIGS. 4 and 11. The opposite edge of each partition plate is alignable with every other tray or divider T of structure S. Accordingly, as fruit is scraped from the surface of a tray T, it will gravitate toward and through the subjacent fruit guide, being deposited upon the upper surface of one of the conveyor belts 65. Movement of the conveyor belt carries the supported fruit in pathways defined by plates of the fruit guide, said plates serving to prevent lateral movement of the fruit across the belt and thus insuring an even distribution of the fruit. Moreover, since the partition plates extend to a position overlying individual bins of hoppers 85 or 86, the fruit originally supported on certain trays T may be kept separated from the fruit of other trays. This feature is of particular importance where it becomes essential to identify the dried fruit of a particular grower and where the fruit of several growers may be stacked together but on separate trays.

Figure 6:
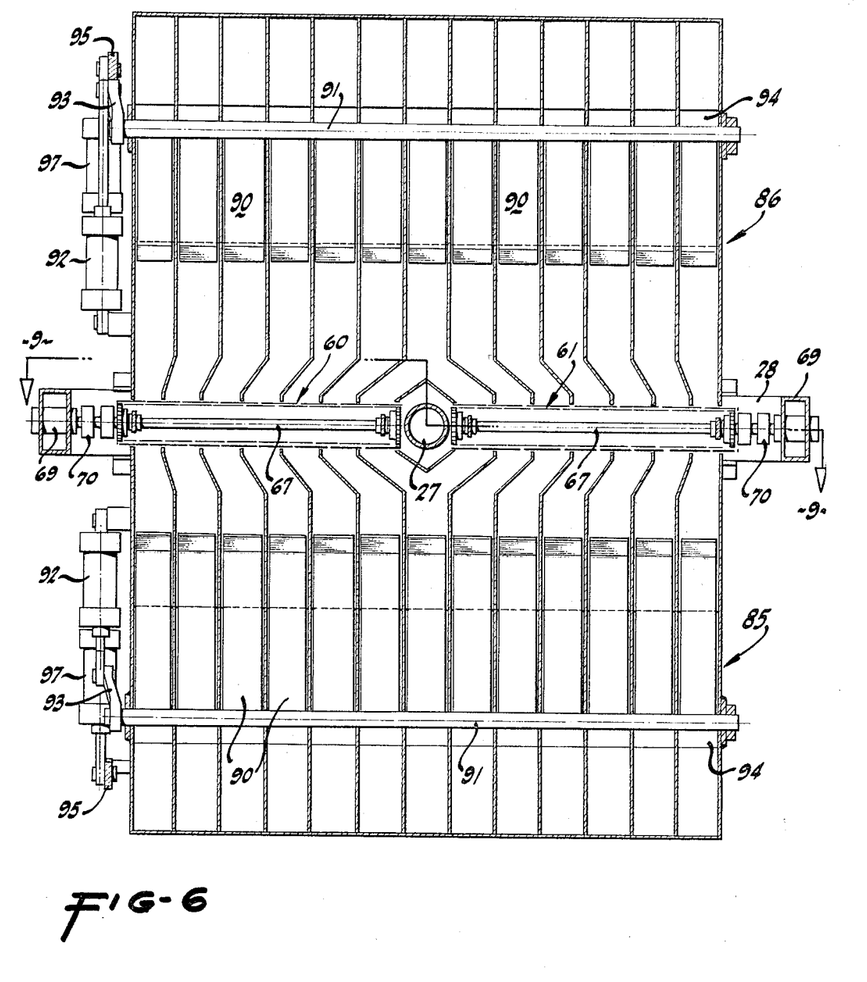
FIG. 6 is a section taken on lines 6—6 of FIG. 2.

Referring to FIG. 6, hoppers 85 and 86 are constructed identically and having a number of compartments or bins, each bin having a gate 90 secured to a common pivot shaft 91. Gates 90 of one hopper are operated together by a cylinder 92 pivoted to the hopper and pinned to a crank arm 93 secured to shaft 91.

Each hopper is further provided with continuous slidable gate 94, best illustrated in FIG. 2. Gates 94 are operated by a pair of rocker arms 95 disposed at opposite ends of respective hoppers and mounted to a common transverse pivot shaft 96. One of the arms is actuated by a cylinder 97.

Hoppers 85 and 86 are formed with openings which are normally covered by the sliding gates 94 while fruit is being dumped from conveyors 60 and 61. These openings, however, are adapted to be positioned opposite a plurality of chutes 98 (as when the hoppers occupy the position of hopper 86 as shown in FIG. 2). It will be apparent, of course, that fruit contained within the bins of hopper 86 will be discharged through the hopper openings into chutes 98 by merely lifting the sliding gate 94 that is associated therewith. One or more baskets or carts 99 placed beneath chutes 98 receive the fruit discharged therefrom. Of course, the discharge of fruit from hoppers 85 and 86 may be carried out while fruit is being removed from structure S.

Referring to FIG. 2, the means for scraping prunes or other discrete particles from structure S comprises a vertically movable frame 100 supported at four corners by a pair of chains 101, a second pair of chains 102 and a hydraulic cylinder 103. Cylinder 103 is used for vertically raising the scraper assembly or allowing it to descend by gravity, and a counterbalance weight 104 maintains tension on that pair of supporting chains not operated by the cylinder. Frame 100 is guided by pairs of rollers 105 and 106, said rollers making peripheral engagement with the sides of an I-beam post 107 forming legs for an upper rectangular support frame 108.

Chains 101 are secured at one end to frame 100 and are entrained around a symmetrical arrangement of pinions 109 and 110 respectively secured to shafts 111 and 112, each shaft being rotatably supported in bearings on frame 108. Chains 101 are also entrained around gears 113 rotatably mounted on shafts 114, the end of each chain being anchored to a transverse support member as at a point indicated schematically in FIG. 14 by the reference number 115.

Figure 14:
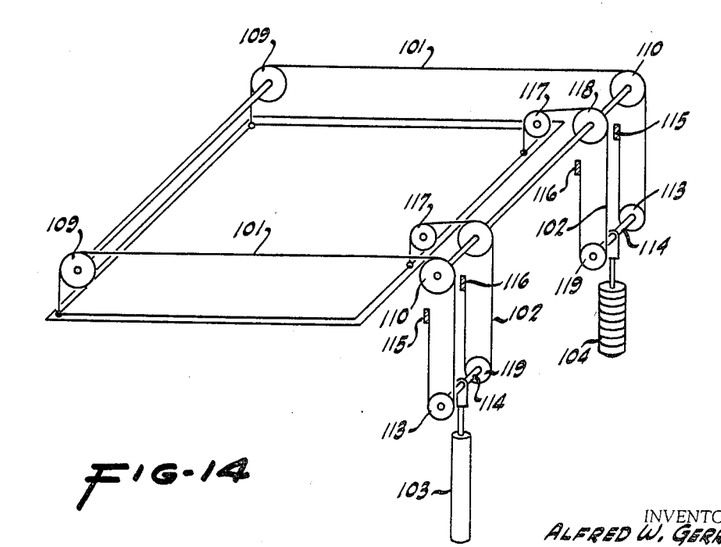
FIG. 14 is a diagrammatic view illustrating the apparatus for vertically moving the scraper assembly.

Chains 102 are connected in a manner similar to chains 101, having one end anchored to the frame 100 and the other end secured at fixed points 116. Each chain 102 is also entrained around a set of three gears 117, 118, and 119. Gears 117 are rotatably mounted from frame 108; gears 118 are secured to shaft 112; and gears 119 are affixed to one end of shaft 114.

Although either one or both of shafts 114 may be vertically actuated by a cylinder 103, only one such cylinder need be utilized where, as shown, drive gears 110 and 118 are secured to the common drive shaft 112.

Vertically movable frame 100 supports four identical finger contact assemblies 125, each pendantly supported from a pair of parallel support members 126 and 127 by two pairs of links 128 and 129. Finger contact assemblies 125 are adapted to be reciprocated in directions parallel with the slots between trays T of structure S by a motor 130, said motor driving a cam shaft 131 that supports rocker arms 132, each rocker arm being eccentrically connected to shaft 131. The finger contact assemblies 125 are operated in a balanced fashion so that every other assembly is moved in the same direction while adjacent assemblies are moved directly opposite to each other.

Figure 7:
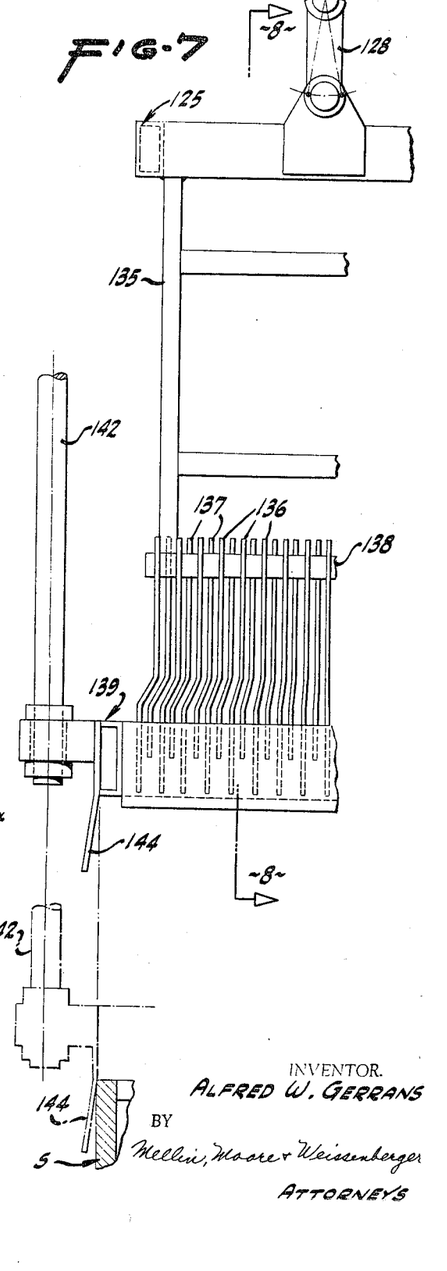
FIG. 7 is an enlarged detail of a portion of the scraper assembly shown in FIG. 2 and also illustrating, in broken lines, an alternate position of the positioning guide forming a portion of the scraper assembly.
Figure 8:
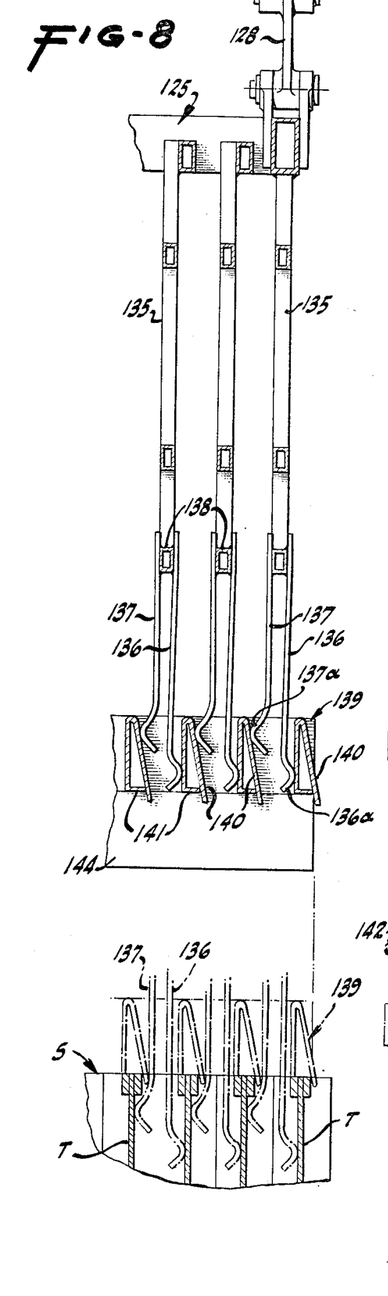
FIG. 8 is a partial section of the scraper assembly taken on lines 8—8 of FIG. 7 and further showing, in broken lines, an alternate position of the positioning guide and scraper contacts relative to the parallel surfaces of an array of drying trays.

Each finger contact assembly 125 comprises a plurality of finger support frames 135 which in turn support pairs of fingers 136 and 137, mounted rigidly to the lower end of frames 135 in the manner shown in FIGS. 7 and 8. In this regard, fingers 136 and 137 are each affixed to lower support bars 138 of frames 135, and each finger projects downwardly. Fingers 136 and 137 are formed with curved contact surfaces 136a and 137a, respectively, and each finger is disposed within a finger guide frame 139 that is longitudinally partitioned by means of wedge-shaped dividers 140. Each divider 140 includes a base strip 141 that is placed into engagement with the surface of structure S as the finger guide frame 139 is lowered together with finger contact assemblies 125.

Finger guide frame 139 is supported at four corners from frame 100 by rods 142, each rod being loosely received through an opening provided in framework 100. Collars 143 secured to the upper ends of rods 142 support the finger guide when frame 100 occupies the position shown in FIG. 2. However, when and as frame 100 is lowered and the finger guide 139 comes into surface engagement with structure S, rods 142 pass freely through the openings of frame 100, thereby permitting a further lowering of finger contact assemblies 125 while finger guide frame 139 rests upon the upper surface of structure S. Guide frame 139 is provided with an inclined lower skirt 144 for centering the guide and fingers 136, 137 relative to trays T. Thus, whenever finger guide 139 is brought into engagement with the upper surface of structure S, the openings between wedge-shaped dividers 140 of the guide will be substantially aligned with the slotted openings formed between the supporting trays T. The guiding function of skirt 144 and dividers 140 is shown by phantom lines in FIGS. 7 and 8.

It is to be noted that fingers 136 and 137 cooperate together as to engage and scrape both surfaces of each tray forming a part of the structure S. Moreover, the resiliency of the fingers and force of contact are used to counterbalance one another, making it unnecessary to provide lateral support for the finger support frames 135.

Figure 13:
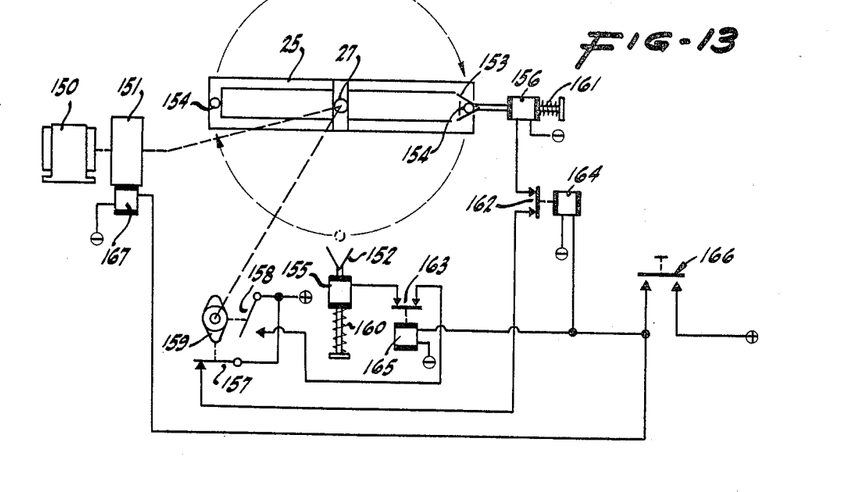
FIG. 13 is a diagrammatic view illustrating an operating circuit for indexing the main support frame and its supported structures in angular increments of 90°.

Referring to FIG. 13, there is schematically shown one system by which the main support frame of structure S may be indexed in angular increments of 90°. A motor 150 drives main support shaft 27 through a clutch 151, and a pair of latching yokes 152 and 153 are mounted to engage either one of a pair of rollers 154 mounted on frame 25. For this purpose the rollers may be secured co-axially to pins 32 and 33 upon which clamping arms 30 are pivoted. Yokes 152 and 153 are adapted to be actuated by solenoids 155 and 156, which are alternately energized through an electric circuit including a pair of control switches 157 and 158, said switches being normally open but positioned to be engaged and closed by a double lobe timing cam 159 driven synchronously with main drive shaft 27. In operation, yokes 152 and 153 are biased into retracted positions by springs 160 and 161, respectively, and as solenoids 155 and 156 are energized, their respective yokes are moved into engagement with one of the rollers 154 which, by reason of timing, will be located opposite the actuated yoke.

The control circuit of FIG. 13 includes a pair of relays having normally closed contacts 162 and 163 which are respectively disposed in series connection with control switches 157 and 1758. Contacts 162 and 163 are opened by energizing relays 164 and 165, each relay being energized through a circuit including a normally open and manually operated switch 166. Switch 166 also closes a circuit for energizing a relay 167 to close clutch 51 and connect motor 150 in driving relation to shaft 27.

It will be seen that closing switch 166 opens relay contacts 162 and 163, allowing springs 160 and 161 to retract their dogging yokes (if they happen to be engaged with a roller 154). After drive shaft 27 makes an angular turn of approximately 90°, switch 166 is allowed to open, disengaging clutch 151 and closing relay contacts 162 and 163. Control cam 159 will, at this time, be positioned to close one or the other of contacts 157 and 158, and the closure of either relay will actuate its associated dogging yoke to engage a positioning roller 154.

*Operation of apparatus*

It will be evident that the above described apparatus may be effectively employed for carrying out the method first described in removing dried prunes from a conventional support structure. More particularly, a first structure S comprised of parallel support trays T are advanced to a pick-up station upon a support dolly 11. This position is such that the front face of the structure S is brought into proximate relation with the vertical edges of either fruit guide 80 or 81. Clamping arms 30 and 31 are then pivoted by actuation of hydraulic cylinders 36, thereby gripping the structure and lifting it free of dolly 11. Main support shaft 27 is next rotated 90°, bringing structure S into a position, as illustrated in FIG. 2, with the supporting surfaces of trays T disposed in vertical planes. While structure S is held rigidly movable frame 100 of the scraping apparatus is lowered and finger guide frame 139 is brought into surface engagement with the structure, said guide coming to rest thereon while contact fingers 136 and 137 continue to be moved downwardly with finger support assemblies 125. Simultaneously, finger contact assemblies 125 are reciproacted in directions parallel with the slots between trays T, and the combined movements of the fingers scrap all surfaces, both front and back sides, of each tray.

As the pairs of contact fingers 136 and 137 come into engagement with pieces of fruit, the fruit is dislodged, falling downwardly into fruit guides 80 or 81 and onto the subjacent surface of the continuous screen belts 65. Each of the belts 65 is then driven by its hydraulic motor 69 which is operated in a direction for advancing fruit toward the hoppers 85 or 86 (whichever hopper is disposed in a receiving relationship to the top surface of the conveyor belts). Gate 90 of such a hopper is held in an open position, while the sliding gate 94 thereof is positioned in front of its discharge opening.

While fruit from a gripped and supported stack S is being removed from the structure and placed in a hopper, any fruit which has been collected in the other hopper assembly may be discharged therefrom into chutes 98. After both operations are completed and with the scraper assembly elevated to its uppermost position, main support shaft 27 is again indexed another 90°. During rotation of shaft 27 and its supported assemblies, or even before that time, a second stack of trays T may be advanced to the pick-up position at which the first stack of trays S had been clamped; and assuming that a second stack of trays has been placed at the "pick-up" station, the first stack of trays may be released as soon as it arrives at the "release" station, which is horizontally displaced from the "pick-up" station.

The first structure S is lowered upon a dolly 11 by pivoting the clamping arms 30 and 31 away from the structure to effect the release. This operation also produces a gripping and lifting action of the second stack of trays. The indexing of shaft 27 another 90° places the second stack of trays in a position for scraping, and this step may be initiated even before the emptied first stack of trays is removed from the "release" station. Such is possible since contact arms 45 which have been used for gripping the first stack of trays, are pivoted laterally out and away from the first structure S at the time the second stack of trays is being gripped.

The above cycle of operation may be continuously repeated for each additional stack of drying trays; and as each stack is emptied, it may be again loaded with fruit for drying and recycled through the processing apparatus.

It is to be understood that various forms of apparatus may be devised to carry out the principles of this invention. In particular, and while the structure S may consist of conventional drying trays nested together in stacked relationship, such structures may also be formed as an integral assembly having fixed shelves. In addition, of course, the particular means for actuating the scraper assemblies and indexing the main drive shaft in increments of 90° are regarded as being but one means for accomplishing the desired result. Accordingly, although a preferred embodiment of the invention has been illustrated and described, it is to be understood that various modifications or changes may be made without departing from the spirit of the invention or the scope of the attached claims, and each of such changes is contemplated.

Having thus described my invention, what I claim and desire to secure by Letters Patent is:

1. Apparatus for removing dried fruit from an array of parallel drying trays, comprising: means including a support frame for gripping and positioning an array of drying trays with surfaces thereof disposed in substantially vertical planes, a scraper assembly including fruit engaging contacts vertically movable between surfaces of adjacent trays, and means for vertically moving said scraper assembly to bring said contacts into engagement with fruit that adheres to supporting surfaces of said trays.

2. Apparatus of the kind described in claim 1 and further comprising means mounted to said support frame for receiving fruit as it gravitates from a gripped array of drying trays and for conveying said fruit from beneath said trays.

3. Apparatus of the kind described in claim 2 and further comprising container means mounted to said support frame for receiving dried fruit from said conveyor, a first movable gate for closing over said container means while said support frame is being pivoted, and a second movable gate for releasing dried fruit from said container means after said support frame is rotated 90° from the position at which the container means is adapted to be filled.

4. Apparatus as described in claim 2 wherein said means for receiving an conveying fruit comprises a partitioned fruit guide having slotted openings matable with openings between surfaces of adjacent drying trays, and a belt conveyor having a supporting surface in close proximate relation to edges of said fruit guide.

5. Apparatus of the kind described in claim 4 and further comprising container means mounted to said support frame for receiving dried fruit from said conveyor, said container means being partitioned by divider panels having edges substantially coplanar with respective edges of said fruit guide.

6. Apparatus of the kind described in claim 1 wherein said scraper assembly comprises a finger support, a plurality of fingers dependently mounted to said finger support, each finger extending downward and being generally aligned with a slotted opening between a pair of adjacent drying trays, the end of each finger defining a fruit engaging contact, and means for reciprocally moving said finger support and fingers in directions parallel with the surfaces of adjacent drying trays.

7. Apparatus of the kind described in claim 6 and further including means for guiding said scraper assembly and said plurality of fingers to position said fingers between surfaces of adjacent drying trays.

8. Apparatus of the kind described in claim 1 wherein said scraper assembly comprises a vertically movable frame; a finger support mounted from said vertically movable frame and adapted to be moved with said frame from a raised first position overlying an array of drying trays to a lowermost second position; a plurality of contact fingers dependently mounted to said finger support, each finger extending downward and being generally aligned with a slotted opening between a pair of adjacent drying trays, the lower ends of said fingers forming fruit engaging contacts and being moved from a position above an array of trays when said finger support occupies its first position through the space between a pair of adjacent drying trays while said finger support is moved into its second position; a finger guide frame; means for supporting said guide frame from said vertically movable frame above an array of drying trays when said finger support occupies its first position, said means allowing said finger guide to engage with and be supported by a subjacent array of drying trays before and during the time said finger support is moved into its second position.

9. Apparatus for removing dried fruit from an array of parallel drying trays, comprising: a support frame, means mounting said support frame upon a horizontal pivot axis, means mounted to said support frame for gripping first and second arrays of drying trays on diametrically opposite sides of said pivot axis, a scraper assembly including fruit engaging contacts mounted above said support frame, and means for vertically moving said scraper assembly to place said contacts between surfaces of adjacent trays and dislodge fruit that adheres to supporting surfaces of said trays.

10. Apparatus of the kind described in claim 9 and further including means mounted to said frame for receiving and conveying fruit as it gravitates from arrays of drying trays gripped on either side of the pivot axis, said means comprising a continuous belt conveyor centrally disposed relative to said pivot axis and having parallel supporting belt lengths extending parallel thereto, and first and second partitioned fruit guides, each having slotted openings disposed in proximate relation to the surface of one parallel belt length, respectively, said fruit guides also having slotted openings matable with openings between surfaces of parallel drying trays gripped as first and second arrays, respectively.

11. Apparatus of the kind described in claim 10 and further comprising first and second containers mounted to said support frame at one end thereof and having openings disposed in receiving relation to the end of said belt, said first and second containers being located on diametrically opposite sides of said pivot axis for receiving fruit from parallel belt lengths, respectively; means for selectively closing over the openings of said first and second containers; and means for selectively releasing dried fruit from said first and second containers.

12. Apparatus of the kind described in claim 9 and further including means for receiving and conveying fruit as it gravitates from a gripped array of drying trays, said means comprising a pair of continuous belt conveyors, each having a frame removably secured to said support frame and a pair of supporting belt lengths that extend parallel to said horizontal pivot axis; and means for reversibly driving each belt conveyor to move the uppermost surface of the belt in the same direction independent of which belt length may be on top when receiving fruit from an array of drying trays.

13. Apparatus of the kind described in claim 9 wherein said means for gripping first and second arrays of drying trays comprises a pair of clamping arms, each arm pivotally supported at its mid-point an equal distance from the horizontal pivot axis of said support frame and on diametrically opposite sides thereof; and means for simultaneously pivoting said pair of arms and moving each an equal distance to grip or release an array of drying trays disposed therebetween.

14. Apparatus of the kind described in claim 13 and further wherein said means for gripping first and second arrays of drying trays comprises a pair of contact arms pivotally mounted to each clamping arm and located at equal distances on opposite sides of the clamping arm pivot; and means for pivotally operating said contact arms to extend one laterally out from the end of its supporting clamping arm as said pair of clamping arms are pivoted to grip an array of drying trays therebetween, the other contact arm of each clamping arm being retracted to permit unobstructed movement of a second array of drying trays therebetween.

15. Apparatus of the kind described in claim 9 wherein said means for gripping first and second arrays of drying trays comprises two pairs of clamping arms, one pair of arms mounted at each end of said support frame and each arm pivotally supported at its mid-point, each clamping arm being pivoted on an axis parallel to and spaced an equal distance from the horizontal pivot axis of said support frame; and means for simultaneously pivoting each pair of arms and moving each an equal distance to release a processed first array of drying trays and grip a second array for processing.

16. In apparatus of the kind described, a scraping mechanism for removing pieces of dried fruit from a support structure comprised of shelves having spaced, parallel upper and lower surfaces, comprising: a partitioned guide frame having speed, parallel dividers; a plurality of finger supports, each support having finger members spaced apart in a line, the line of finger members of one support being parallel with the other lines of fingers and each line of fingers being disposed between an adjacent pair of dividers; and means for raising and lowering said guide frame and finger supports to place said frame in adjacent relation to a support structure and to further move said fingers between parallel surfaces of its shelves.

17. The apparatus of claim 16 wherein each of said line of finger members comprises fingers having contact surfaces for engaging opposite surfaces of the adjacent shelves between which they are moved.

18. The apparatus of claim 16 and further including means for reciprocating said finger supports in a direction parallel to said lines of fingers as said fingers supports are being lowered.

19. In apparatus of the kind described, a fruit guide and conveyor assembly comprising: a main support shaft; a pair of continuous belt conveyors mounted on opposite sides of said support shaft, each conveyor having parallel belt lengths extending in directions parallel to the axis of said support shaft; and a pair of fruit guides mounted from said support shaft, one fruit guide having barrier edges disposed in close proximate relation to one belt length of each conveyor and the other fruit guide having barrier edges disposed in close proximate relation to the other belt length of each conveyor.

20. The apparatus of claim 19 and further including a pair of hoppers mounted to said main support shaft, each hopper having an opening disposed beneath one end of said pair of continuous belt conveyors; means for selectively closing the opening of each hopper; and means for discharging the contents of each hopper.

21. The apparatus of claim 19 and further including at least one pair of pivoted clamping arms mounted from said support shaft at points radially distant therefrom, each clamping arm being pivoted on an axis parallel to the axis of said main support shaft, said pivot axis being located on opposite sides of said pair of continuous belt conveyors; and means for actuating said clamping arms upon their respective pivot axis to grip a structure disposed therebetween and support the structure in alignment with edges of one fruit guide.

References Cited by the Examiner
UNITED STATES PATENTS

| | | | |
|---|---|---|---|
| 762,459 | 6/1904 | Yere | 107—56 |
| 848,748 | 4/1907 | Kawasaki | 107—67 |
| 1,014,333 | 1/1912 | Saeger | 15—104.1 |
| 2,520,252 | 8/1950 | Mutchler | 214—1 X |
| 2,702,943 | 3/1955 | Persson | 214—1 X |

HUGO O. SCHULZ, *Primary Examiner.*